United States Patent [19]

Bailey, Jr.

[11] Patent Number: 4,696,123
[45] Date of Patent: Sep. 29, 1987

[54] REEL MOUNT FOR A FISHING ROD
[75] Inventor: Joe B. Bailey, Jr., Lexington, S.C.
[73] Assignee: Shakespeare Company, Columbia, S.C.
[21] Appl. No.: 412,203
[22] Filed: Aug. 27, 1982
[51] Int. Cl.⁴ .............................................. A01K 87/06
[52] U.S. Cl. ................................................ 43/22
[58] Field of Search ................. 43/22, 23; 403/188, 403/253, 254, 255, 263, 373

[56] References Cited

U.S. PATENT DOCUMENTS

| | | | |
|---|---|---|---|
| 3,296,732 | 1/1967 | Magnus | 43/22 |
| 3,564,752 | 2/1971 | Catignani | 43/22 |
| 3,698,118 | 10/1972 | Schultz | 43/22 |
| 3,883,978 | 5/1975 | Ohmura | 43/22 |
| 4,021,129 | 5/1977 | Sykes | 403/255 |
| 4,124,317 | 11/1978 | Dauth | 403/254 |
| 4,133,433 | 1/1979 | Wolf | 403/255 |
| 4,334,378 | 6/1982 | Worth | 43/22 |
| 4,354,399 | 10/1982 | Katayama | 403/373 |

FOREIGN PATENT DOCUMENTS 2074643 11/1981 United Kingdom ............... 403/373

Primary Examiner—Kurt Rowan
Attorney, Agent, or Firm—Renner, Kenner, Greive, Bobak & Taylor

[57] ABSTRACT

A reel mount incorporated within the handle (10) of a fishing rod. The gripping portion (14) of the handle (10) has a smoothly contoured exterior gripping surface (14) and a hollow, interior cavity (20) into which the foot (15) of a reel (16) may be received. An aperture (23) penetrates the gripping surface (14), and the foot (15) may be button holed through the aperture (23) to be received within the cavity (20). A seating surface (45) is provided at the longitudinal extremities of the aperture (23), and a pressure plate (38) is translatable demountably to secure the foot (15) between the seating surface (45) and the pressure plate (38). A threaded shaft (36) is attached to the pressure plate (38), and an adjusting nut (35)—which threadably engages the shaft (36)—is rotatably received within a passageway (32) oriented transversely through the handle (10). The diameter of the adjusting nut (35) is substantially equal to the diameter of the handle (10) at the location where the opposite ends of the passageway (32) open through the outer surface (14) of the handle (10).

8 Claims, 4 Drawing Figures

REEL MOUNT FOR A FISHING ROD

TECHNICAL FIELD

The present invention is directed generally to a fishing rod handle assembly. More particularly, the present invention is directed to an improved arrangement by which a reel can be independently secured to the handle of the fishing rod. Specifically, the present invention is directed to an improved arrangement by which the foot of a spinning reel can be secured to the handle of a fishing rod without adversely affecting the smoothly contoured, outer surface of the handle.

BACKGROUND ART

Historically, spinning reels have been secured to the handle of fishing rods in one of several known ways. Perhaps the oldest way, and to date the way which has afforded the most comfort to the fisherman, was by the use of sliding rings. Although admittedly comfortable, because the sliding rings tended to squeeze the foot of the reel directly against the soft surface of the handle—often cork—the arrangement has never been acceptably secure. After one or two experiences when the reel has come loose at a most inopportune time for the fisherman, the angler normally succumbs to supplementing the rings—or replacing them—by wrapping a waterproof tape such as electricians' plastic tape, about the handle to secure the foot of the reel to the handle. Such makeshift arrangements, while comfortable, work to destroy the handle if the tape is repeatedly applied and removed, or at least precludes the convenience of having a demountable reel if the tape is left in situ.

The prior known, fixed reel seat serves to obviate the insecurity inherent to the sliding ring mounting arrangement and maintains the convenience of permitting the reel to be demountably secured to the handle. However, such arrangements are anything but comfortable. In a fixed seating arrangement a normally metallic reel seat is provided on the handle to receive the foot of the reel, and one of a variety of clamping arrangements may be selectively tightened or released by actuating mechanisms which interrupt the otherwise smoothly contoured exterior surface of the handle. One of the most commonly employed arrangements for a fixed seat arrangement employs one hooded ring which is fixedly secured to the handle and into which one distal end of the reel foot can be received. A sliding ring is provided with a hooded portion within which the opposite distal end of the reel foot is received, and a knurled lock nut moves along a threaded portion of the handle abuttingly to secure the foot of the reel between the fixed and sliding rings. The hooded rings, the exposed portion of the foot spanning therebetween, the threaded portion of the handle and the knurled lock nut all combine to provide a composite surface that irritates, and abrades, the skin on the fisherman's hand after several hours of usage.

Casting, and spin casting, reels, because the reel mounting seat is axially displaced from the portion of the handle which is gripped by the fisherman, have heretofore adapted themselves more readily to comfortable, and yet acceptably more functional mounting arrangements. One such highly acceptable mount that is particularly adapted for use with spin casting reels is taught in U.S. Pat. No. 3,276,160 owned by my assignee. However, because it is necessary for the fisherman to grasp the rod handle at the same location at which the spinning reel is mounted on the handle, such prior known arrangements have not been effectively adapted for use with spinning reels.

DISCLOSURE OF THE INVENTION

It is, therefore, a primary object of the present invention to provide an arrangement by which to secure a spinning reel to the handle of a fishing rod without impairing the smoothly contoured outer surface of the handle.

It is a further object of the present invention to provide a spinning reel mounting arrangement, as above, which permits the reel to be demountably secured with facility.

It is another object of the present invention to provide a spinning reel mounting arrangement, as above, which is acceptably secure so as not inadvertently to release the reel.

It is yet another object of the present invention to provide a spinning reel mounting arrangement, as above, which is relatively inexpensive to manufacture and maintain but which will provide long life even when subjected to arduous use.

These and other objects, which will become apparent from the following specification, are accomplished by means hereinafter described and claimed.

In general, a fishing rod handle embodying the concept of the present invention has a hollow, gripping portion with a smoothly contoured exterior surface. An aperture through the gripping surface provides the access through which the foot of the fishing reel can be "buttonholed". With the foot received within the hollow interior cavity, a pressure plate releasably clamps the foot by manual actuation of an adjusting nut accessible from exteriorly of the handle but without destroying the effectiveness of the smoothly contoured surface thereof.

One preferred embodiment of the present invention is shown by way of example in the accompanying drawings without attempting to show all of the various forms and modifications in which the invention might be embodied; the invention being measured by the appended claims and not by the details of the specification.

PREFERRED EMBODIMENT FOR CARRYING OUT THE INVENTION

Figure 1:
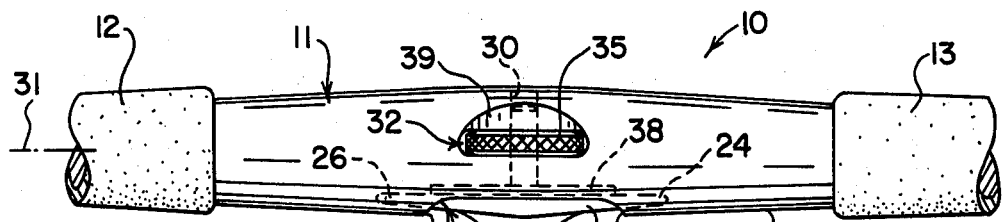
FIG. 1 is a side elevation of a fishing rod handle embodying a fishing reel mounting arrangement according to the concept of the present invention.

A fishing rod handle embodying the concept of the present invention is designated generally by the numeral 10 in FIG. 1. The handle 10 is characterized by a metallic, central gripping portion 11 disposed between a cork fore grip 12 and a cork rear grip 13. The outer surface 14 of the central gripping portion 11 may be configured as desired for maximum comfort. However, the slightly tapered, "barrel grip", cylindrical outer surface 14 depicted provides a virtually universally acceptable comfort level to the user, and the foot 15 of the reel 16 is demountably secured to the handle without compromising the smoothly contoured outer surface 14 in the least. Only the existence of the leg 18, which spaces the foot 15 from the body portion 19 of the reel 16 extends outwardly from the handle 10.

The interior of the central gripping portion 11 is provided with a hollow cavity 20 into which the foot 15 of the reel 16 may be received. A pedestal portion 21 is integral with the wall 22 which presents the "barrel grip" surface 14 on the central portion 11 of the handle 10 and extends interiorly of the gripping portion in opposition to the foot receiving aperture 23.

The aperture 23 is preferrably of slightly wider dimension than the foot 15 but must be of lesser longitudinal dimension than the foot 15, although certainly never less than one half of the longitudinal dimension of the foot. In that way the foot can be insertably received through the aperture 23 by a longitudinal "button holing" movement of the foot. That is, either distal toe 24 of the foot may be inserted through the aperture 23 and then displaced longitudinally until the leg 18 strikes the end wall 25 of the aperture. At that time the opposite distal toe 26 of the foot 15 can be swung inwardly past the opposite end wall 28 of the aperture 23 and the foot 15 thereafter centered with respect to the aperture 23—this procedure normally designated as "button holing."

A bore 30 which is oriented transversely in the longitudinal axis 31 of the handle 10 extends into the pedestal 21. The bore 30 may be blind, or it may penetrate the outer surface 14 of the handle, as determined by the convenience of the manufacturing process.

Oriented transversely of both the longitudinal axis 31 and the bore 30 is a passageway 32 which preferrably penetrates the pedestal 21 to open through both sides of the handle and which houses the adjusting nut 35. The adjusting nut 35 operably engages a threaded shaft 36 which is fixably secured to a pressure plate 38.

The diameter of the adjusting nut 35 is substantially equal to the diameter of the handle 10 at the point where the passageway 32 opens through the outer surface 14 of the handle. In other words, the diameter of the nut 35 is substantially no greater than the dimension of the span of the passageway 32 as it opens through the opposed sides of the gripping portion 11 in order not to extend outwardly thereof and thereby interrupt the smooth contour of the outer surface 14 on the handle 10 which is engaged by the fisherman's hand. Access to the adjusting nut 35 is enhanced by providing opposed, concave recesses 39 and 40 in the outer surface 14 of the handle 10 which intersect the passageway 32 to assure sufficient access for facile manual manipulation of the adjusting nut 35.

The thickness of the adjusting nut 35 is substantially equal to the corresponding dimension of the passageway 32 in which the adjusting nut is received and yet is of sufficiently lesser dimension in thickness as to permit unimpended insertion and rotation of the adjusting nut 35 into and within the passageway 32. Thus, with the adjusting nut 35 threadably received on the shaft 36, rotation of the nut to react against the wall 41 of the passageway 32—said wall 41 formed by the inner surface of the bridge 42 spanning the pedestal 21 proximal to the aperture 23—causes the pressure plate 38 to retract within the handle.

Figure 2:
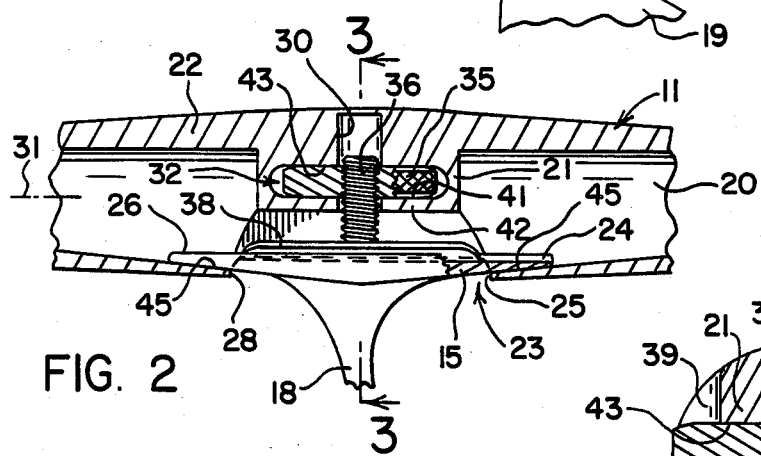
FIG. 2 is an enlarged portion of FIG. 1 but in longitudinal cross section.
Figure 3:
FIG. 3 is a further enlarged section taken substantially along line 3—3 of FIG. 2; and, FIG. 4 is an exploded perspective of that portion of the fishing rod handle depicted in FIG. 2 but with the handle rotated 180 degrees about its own longitudinal axis.
Figure 4:
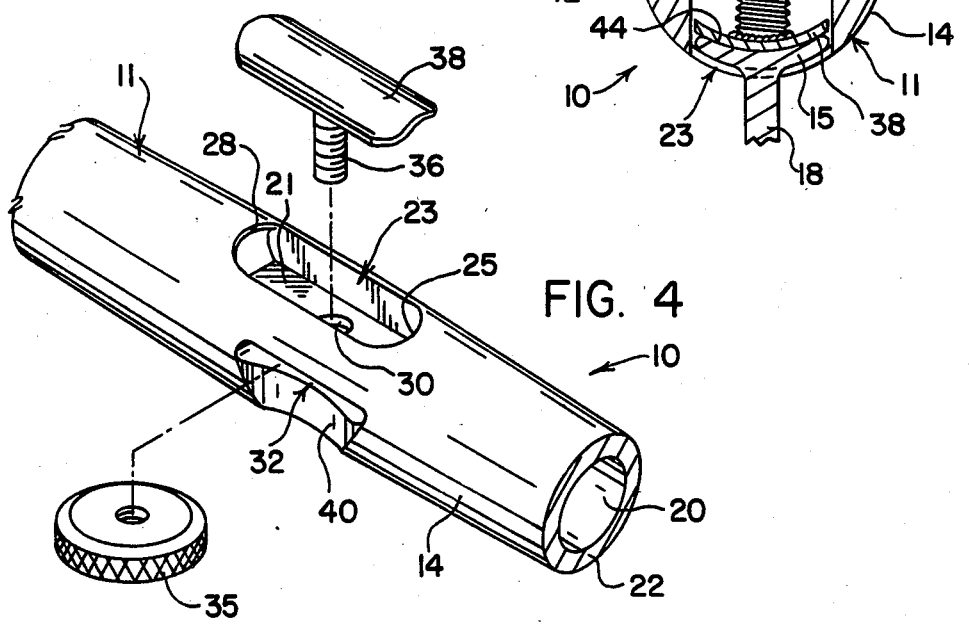

When the pressure plate 38 has been sufficiently retracted, the foot 15 of the reel 16 may be button holed into the handle and positioned with the leg 18 located in approximately the central portion thereof. So positioned, rotation of the adjusting nut 35 to react against the wall 43 of the passageway 32—said wall 43 formed by the main body of the pedestal 21 in opposition to the wall 41—causes the pressure plate 38 to be translated away from the bridge 42 and into engagement with the cylindrical under surface 44 of the foot 15 and thereby releasably to clamp the foot 15 between the pressure plate 38 and the seating surface 45 which is provided at the longitudinal extremities of the aperture 23 within the cavity 20, as depicted in FIGS. 1 through 3.

It should be appreciated that whereas the threaded shaft 36 must be freely translatable within the bore 30, if the diameter of the bore 30 is only slightly greater than the diameter of the shaft 36, the inter-engagement of the shaft with the bore may serve to maintain the longitudinal relationship of the pressure plate 38 with respect to the aperture 23. Similarly, the diameter of the adjusting nut 35 in relation to the longitudinal dimension of the passageway 32—so long as the adjusting nut 35 remains freely rotatable within the passageway 32—may also serve to maintain the desired disposition of the pressure plate 28 with respect to the aperture 23.

So mounted, the fisherman's hand can grasp the smoothly contoured handle which is interrupted only by the leg 18 of the reel 16 which emanates outwardly from the aperture 23. As such, the subject invention provides an arrangement by which demountably to secure a reel, and particularly a spinning reel, to the handle of a rod without impairing the smoothly contoured outer surface of the handle and otherwise accomplishes the objects of the invention.

I claim:

1. In the handle of the fishing rod, a reel mount comprising: a gripping portion, said gripping portion having a smoothly contoured exterior gripping surface and a hollow interior cavity into which the foot of a reel may be received; an aperture penetrating said gripping surface, the dimensions of said aperture permitting the foot of the reel to be button holed therethrough; a fixed seating surface within said cavity at the longitudinal extremities of said aperture; a pressure plate received within said cavity in opposition to said aperture; and, adjusting means to translate said pressure plate and thereby releasably to clamp the reel foot between said pressure plate and said seating surface.

2. A reel mount, as set forth in claim 1, wherein said adjusting means further comprises: a threaded shaft connected to said pressure plate; nut means threadably engaging said shaft; and, means to effect relative rotation between said shaft and the nut means whereby to translate said pressure plate.

3. A reel mount, as set forth in claim 2, wherein said nut means further comprises: an adjusting nut rotatably received within said handle and accessible to be manually rotated from exteriorly of said handle.

4. A reel mount, as set forth in claim 2, wherein said adjusting means further comprises: a pedestal within said handle; a bore extending into said pedestal in opposition to said aperture; a passageway in said pedestal oriented transversely to said bore, interpedestal secting said bore and opening through the gripping portion of the handle; and threaded shaft translatably received within said bore; and, an adjusting nut rotatably received within said passageway and threadably engaging said shaft such that rotation of said adjusting nut translates said pressure plate.

5. A reel mount, as set forth in claim 4, wherein the diameter of said bore is only slightly greater than the diameter of said threaded shaft.

6. A reel mount, as set forth in claim 4, wherein said passageway provides opposed walls against which said adjusting nut can react to effect translation of the pressure plate in response to rotation of said adjusting nut.

7. A reel mount, as set forth in claim 4, wherein the diameter of said adjusting nut is of substantially no greater dimension than the dimension of the span of said passageway as it opens through the opposed sides of said gripping portion.

8. A reel mount, as set forth in claim 7, wherein concave recesses are provided in the outer surface of the handle to intersect the passageway and thereby enhance access for manual rotation of the adjusting nut.

* * * * *